United States Patent
Masuda

(10) Patent No.: US 10,944,309 B2
(45) Date of Patent: Mar. 9, 2021

(54) ELECTRIC MOTOR DEVICE

(71) Applicant: NTN CORPORATION, Osaka (JP)

(72) Inventor: Yui Masuda, Iwata (JP)

(73) Assignee: NTN CORPORATION, Osaka (JP)

( * ) Notice: Subject to any disclaimer, the term of this patent is extended or adjusted under 35 U.S.C. 154(b) by 51 days.

(21) Appl. No.: 16/279,187

(22) Filed: Feb. 19, 2019

(65) Prior Publication Data

US 2019/0181721 A1 Jun. 13, 2019

Related U.S. Application Data

(63) Continuation of application No. PCT/JP2017/029170, filed on Aug. 10, 2017.

(30) Foreign Application Priority Data

Aug. 19, 2016 (JP) .............................. JP2016-161151

(51) Int. Cl.
*H02K 7/12* (2006.01)
*H02K 7/06* (2006.01)
(Continued)

(52) U.S. Cl.
CPC .............. *H02K 7/12* (2013.01); *F16D 65/18* (2013.01); *H02K 7/06* (2013.01); *H02K 16/04* (2013.01); *H02K 21/16* (2013.01)

(58) Field of Classification Search
CPC .. H02K 7/00; H02K 7/06; H02K 7/10; H02K 7/102; H02K 7/1028; H02K 7/12;
(Continued)

(56) References Cited

U.S. PATENT DOCUMENTS 3,975,668 A * 8/1976 Davie ....................... H02P 3/24
318/762
4,129,797 A * 12/1978 Lindner ............... H02K 7/1028
188/218 XL
(Continued)

FOREIGN PATENT DOCUMENTS

CN 102545499 A 7/2012
DE 102013013375 A1 12/2015
(Continued)

OTHER PUBLICATIONS

Extended European Search Report dated Feb. 21, 2020 in European Patent Application No. 17841470.2 (5 pages).
(Continued)

*Primary Examiner* — Tran N Nguyen

(57) ABSTRACT

When a rotor performs an ordinary rotation operation, an axial position of the rotor is retained such that the rotor is rotatable with respect to a stator. When a parking brake switch is operated while a vehicle is at stoppage, a rotor slider slides the rotor in an axial direction against a preload of an axially preloading part. This brings an engaging portion of the rotor into engagement with an engaged portion of a housing. The reverse input holder retains the rotation angle of the rotor during the engagement due to the fact that the engagement between the engaging portion and the engaged portion is maintained against a reverse input load acting on the rotor as an external force that accompanies a reaction force of a pressing force of a brake friction member.

5 Claims, 9 Drawing Sheets

(51) Int. Cl.
*H02K 16/04* (2006.01)
*F16D 65/18* (2006.01)
*H02K 21/16* (2006.01)

(58) Field of Classification Search
CPC ........ H02K 7/125; H02K 16/00; H02K 16/04; F16D 65/00; F16D 65/18; F16D 65/21; F16D 66/00; F16D 66/02; F16D 66/021
See application file for complete search history.

(56) References Cited

U.S. PATENT DOCUMENTS

| | | | |
|---|---|---|---|
| 6,158,558 A * | 12/2000 | Bill | F16D 65/18 188/162 |
| 7,810,616 B2 | 10/2010 | Nakazeki | |
| 2008/0110704 A1 | 5/2008 | Nakazeki | |
| 2012/0146445 A1 | 6/2012 | Tokoi et al. | |

FOREIGN PATENT DOCUMENTS

| EP | 1837555 A1 | 9/2007 |
|---|---|---|
| GB | 1544011 | 6/1977 |
| JP | 49-102905 | 9/1974 |
| JP | 55-62166 | 10/1980 |
| JP | 2003-247576 | 9/2003 |
| JP | 2005-94932 | 4/2005 |
| JP | 2006-183809 | 7/2006 |
| JP | 2008-109842 | 5/2008 |
| JP | 2013-1203 | 1/2013 |

OTHER PUBLICATIONS

First Chinese Office Action dated Mar. 24, 2020 in Chinese Patent Application No. 201780050171.7.
Japanese Office Action dated Oct. 8, 2019 in corresponding Japanese Patent Application No. 2016-161151.
English Translation by WIPO of the International Preliminary Report on Patentability dated Feb. 28, 2019 in corresponding International Patent Application No. PCT/JP2017/029170 (7 pages).
International Search Report dated Nov. 14, 2017 in corresponding International Application No. PCT/JP2017/029170.
Notice of Reasons for Refusal, dated May 19, 2020, in corresponding Japanese Application No. 2016-161151 (4 pp.).
Office Action, dated Oct. 23, 2020, in corresponding Chinese Application No. 201780050171.7 (13 pp.).

* cited by examiner

ELECTRIC MOTOR DEVICE

CROSS REFERENCE TO THE RELATED APPLICATION

This application is a continuation application, under 35 U.S.C. § 111(a), of international application No. PCT/JP2017/029170, filed Aug. 10, 2017, which is based on and claims priority to Japanese patent application No. 2016-161151, filed Aug. 19, 2016, the entire disclosure of which is incorporated by reference into this application.

BACKGROUND OF THE INVENTION

Field of the Invention

The present invention relates to an electric motor device and to a structure for locking rotation of a rotor.

Description of Related Art

The following technologies have been proposed as reverse input holding structures for locking rotation of a rotor of an electric motor:

1. a parking brake mechanism in an electric brake device in which an electric motor, a linear motion mechanism and a reduction gear or speed reducer are used (Patent Document 1); and
2. an electric brake device having a function of locking a gear (Patent Document 2).

RELATED DOCUMENT

Patent Document

[Patent Document 1] JP Laid-open Patent Publication No. 2006-183809
[Patent Document 2] JP Laid-open Patent Publication No. 2003-247576

For example, an electric brake device in which an electric actuator is used as in Patent Documents 1 and 2 requires, for an application in a parking brake, a reverse input holding structure or holder for holding a pressing force with least power consumption against a reverse input to an electric motor that accompanies a reaction force of a pressing force of a brake friction member. In this case, for example, as in the patent documents, when a lock mechanism is constituted outside with a drive mechanism, such as a solenoid, and an engagement structure, such as a ratchet, the solenoid and engagement structure may increase cost and installation space.

Also, for example, when an engagement part of a lock mechanism is provided in a reduction gear as in Patent Document 2, this reduction gear is necessary regardless of design requirements for an actuator. In such a reduction gear design, as design restriction is imposed by the fact that the lock mechanism is engageable, a reduction gear that is essentially unnecessary may have to be provided.

SUMMARY OF THE INVENTION

The object of the present invention is to provide an electric brake device having a reverse input holder, the device making it possible to save space, to reduce the number of components and to reduce costs.

The electric brake device of the present invention is an electric motor device having a housing, a stator fixed to the housing, and a rotor supported by the housing and configured to rotate with respect to the stator, wherein the rotor is configured to be slidable in an axial direction of a rotation axis, the electric motor device further includes a rotor slider configured to slide the rotor in the axial direction and a reverse input holder configured to prevent rotation of the rotor in at least one direction, the reverse input holder includes an engaging portion provided on the rotor and an engaged portion provided on the housing and configured to be engaged by the engaging portion in a state that the rotor is caused to slide in one axial direction by the rotor slider, and when the engaging portion and the engaged portion are in engagement, the engagement (or engagement state) between the engaging portion and the engaged portion is maintained against a reverse input load that acts on the rotor as an external force, and thereby retains a rotation angle of the rotor.

According to this configuration, when the rotor performs an ordinary rotation operation, an axial position of the rotor is retained while the rotor is rotatable with respect to the stator. When the rotation of the rotor is prevented in at least one direction by the reverse input holder in response to a switch operation or the like by an operator, the rotor slider slides the rotor in one axial direction. This brings the engaging portion of the rotor into engagement with the engaged portion of the housing. The reverse input holder retains the rotation angle of the rotor during the engagement, for example, due to the engagement between the engaging portion and the engaged portion to be maintained against a reverse input load acting on the rotor as an external force that accompanies a reaction force of a pressing force of a brake friction member.

In such a way, use of a structure, which slides the rotor in one axial direction to bring the engaging portion of the rotor and the engaged portion of the housing into engagement, eliminates the necessity of externally providing a lock mechanism, such as a solenoid, as a separate component. Thus, it is possible to save space and to reduce the number of components. Reduction of unnecessary components such as a reduction gear makes it possible to save space, to reduce the number of components as well as to reduce costs. When a reverse input load acts on the rotor, for example, the friction force generated on the contact surfaces between the engaging portion and the engaged portion keeps the state that the rotor is slid in one axial direction and thereby maintains the engagement. Even when power applied to the motor is shut off or lowered, the engagement is maintained so as to retain the rotation angle of the rotor. Thus, it is possible to suppress power consumption of a vehicle or a device on which the electric brake device is mounted.

The electric brake device may have an axially preloading part for applying preload on the rotor against the housing so as to hold the axial position of the rotor, and the rotor slider may be configured to slide the rotor in the axial direction against the preload of the axially preloading part. The preload can be any preload that is set according to the design or the like and is set to a preload that meets conditions or the like for at least holding the axial position of the rotor so as to allow the rotor to be rotatable with respect to the stator, according to, for example, one or both of tests and simulations.

According to this configuration, when the rotor performs an ordinary rotation operation, the axially preloading part applies a preload on the rotor against the housing to ensure that the axial position of the rotor is maintained. When the rotation of the rotor is prevented in at least one direction, the rotor slider can cause the rotor to be slid in the axial direction against the preload of the axially preloading part and, bring the engaging portion into engagement with the engaged portion, resulting in engaging. Thus, it is possible to easily and reliably shift the axial positions of the rotor.

The rotor and the stator may be arranged such that orientations or directions of magnetic poles are in parallel with the rotational axis. The rotor slider may be configured to slide the rotor in the axial direction by an electromagnetic force in the axial direction that acts on the stator and the rotor. The term "parallel" used herein includes not only a state where lines such as the orientations and the axis are exactly parallel to each other, but also a state where the same result can be obtained as the state where they are exactly parallel to each other or a state where they can be considered as being exactly parallel.

The electric motor device has a so-called axial gap motor in which a rotor and a stator are arranged such that orientations of magnetic poles are in parallel with a rotational axis. Such an axial gap motor can generate a strong electromagnetic force in comparison with, for example, a radial gap motor having magnetic poles in a radial direction of a rotational axis. According to this configuration, the rotor slider can slide the rotor in the axial direction owing to the electromagnetic force in the axial direction of the axial gap motor using the existing stator and rotor. As the rotor can be slid in the axial direction by using the existing stator and rotor in such a manner, it is possible to save space, to reduce the number of components and to reduce costs in comparison with, for example, a configuration externally added with a lock mechanism, such as a solenoid and an electromagnet.

The rotor may be a magnetic field mechanism having a permanent magnet. The stator may be an excitation mechanism having coils that form a magnetic circuit corresponding to three-phase alternating current.

The rotor slider may be configured to generate the electromagnetic force by a current component corresponding to an excitation magnetic flux in a direction corresponding to an orientation of magnetic poles of the magnetic field mechanism.

The term "current component" refers to a current component corresponding to a d-axis current in current vector control in a permanent magnet synchronous motor.

For example, when a d-axis current that weakens the excitation magnetic flux is applied, a repulsive force is generated in the axial direction between the stator and the rotor, whereas, when a d-axis current that enhances the excitation magnetic flux is applied, an attractive force is generated in the axial direction between the stator and the rotor. According to this configuration, the rotor slider adjusts the d-axis current in the stator such that an electromagnetic force is generated to slide the rotor in the axial direction. In this way, it is possible to slide the rotor in the axial direction without providing any dedicated mechanism or the like for sliding the rotor.

The rotor may have a magnetic body on an axial end face thereof, and the rotor slider may be an electromagnet arranged so as to face the magnetic body. In this case, the attractive force of the electromagnet can slide the rotor in the axial direction to bring the engaging portion in engagement with the engaged portion.

The device may also be configured such that the engaging portion is provided on an axial end face of the rotor; the engaged portion is provided on a surface of the housing opposite to the axial end face of the rotor; and the engaging portion and the engaged portion have contact surfaces that can contact with each other in a circumferential direction. In this case, rotation of the rotor is prevented by engaging the engaging portion and the engaged portion, and the contact surface of the engaging portion and the contact surface of the engaged portion come into contact to generate a friction force between the contact surfaces, against a reverse input load. Thus, the rotation angle of the rotor is retained.

The device may also be configured such that the engaging portion is provided on an outer circumferential surface of the rotor; the engaged portion is provided on an inner circumferential surface of the housing opposite to the outer circumferential surface of the rotor; and the engaging portion and the engaged portion have contact surfaces that can contact with each other in a circumferential direction. Also, in this case, rotation of the rotor is prevented by engaging the engaging portion and the engaged portion, and the contact surface of the engaging portion and the contact surface of the engaged portion come into contact to generate a friction force between the contact surfaces, against a reverse input load. Thus, the rotation angle of the rotor is retained.

Any combination of at least two constructions disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will be more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF THE EMBODIMENTS

Figure 1:
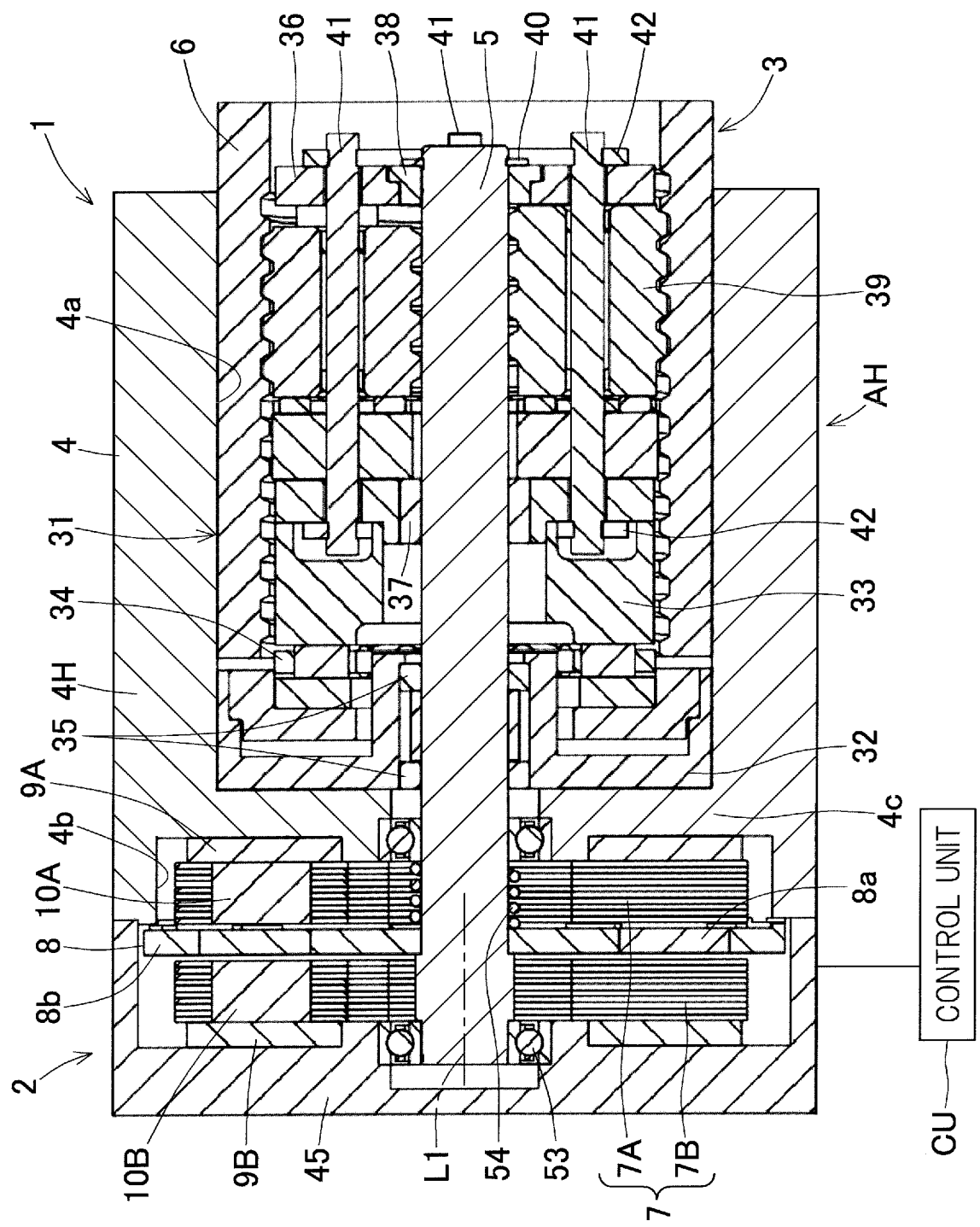
FIG. 1 is a sectional view of an electric motor device according to one embodiment of the present invention.

An electric motor device according to one embodiment of the present invention is described with reference to FIG. 1 to FIG. 6. The electric motor device is mounted on, for example, a vehicle. As shown in FIG. 1, the electric motor device 1 has an electric motor 2 and a linear motion mechanism 3 which are connected in series in an axial direction. The electric motor device 1 includes an actuator main body AH and a control unit CU described later. The actuator main body AH includes an electric motor 2, a linear motion mechanism 3 and a housing 4. The electric motor 2 in this example is an axial gap motor of the double stator type. The linear motion mechanism 3 includes a linear motion part 6 and converts rotary motion of the electric motor 2 into linear motion of the linear motion part 6 via a rotary input-output shaft 5. The housing 4 is formed in a cylindrical shape and supports the linear motion mechanism 3 and the electric motor 2.

The structure of the electric motor 2 will be schematically described. The electric motor 2 is a so-called axial gap type motor having a stator 7 and a rotor 8 arranged such that orientations of magnetic poles thereof, which generate interlinkage flux contributing to generating torque, are parallel with a rotational axis L1 of the electric motor 2. The stator 7 is statically fixed to the housing 4. The rotor 8 is statically fixed to the rotary input-output shaft 5 of the linear motion mechanism 3 and generates rotational torque by interlinkage flux generated between the rotor 8 and the stator 7 which are spaced apart from one another. The rotor 8 is a magnetic field mechanism having, for example, a permanent magnet and having torque generating surfaces on both axial surfaces of the rotor 8. The aforementioned term "statically" or "static" means a relation that elements move substantially synchronously except for the influence of a clearance or the like (in other words, a relatively restrained relation).

The housing 4 will be explained. The housing 4 has a housing main body 4H and a motor cover 45. The housing main body 4H is provided with a linear motion mechanism accommodating part 4a that accommodates most part of the linear motion mechanism 3, a motor accommodating part 4b that accommodates part of the electric motor 2, and a separation wall 4c that separates the linear motion mechanism accommodating part 4a and the motor accommodating part 4b from each other. The motor accommodating part 4b is disposed on one axial end side within the housing main body 4H, and the linear motion mechanism accommodating part 4a is disposed on the other axial end side within the housing main body 4H.

The separation wall 4c is disposed so as to be perpendicular to the axial direction of the rotary input-output shaft 5 that is parallel with the rotational axis L1, and is formed with a through hole through which the rotary input-output shaft 5 is inserted from the linear motion mechanism accommodating part 4a into the motor accommodating part 4b. The motor cover 45 has a closed-end cylindrical shape that closes an open end of the housing main body 4H on the electric motor 2 side (the one axial end side). The housing main body 4H and the motor cover 45 are coaxially coupled to each other by socket-and-spigot type fitting. In this example, an outer circumferential surface that is an annular stepped portion at the open end of the housing main body 4H is coupled by socket-and-spigot type fitting with an inner circumferential surface that is an annular stepped portion at an open end of the motor cover 45.

Figure 2A:
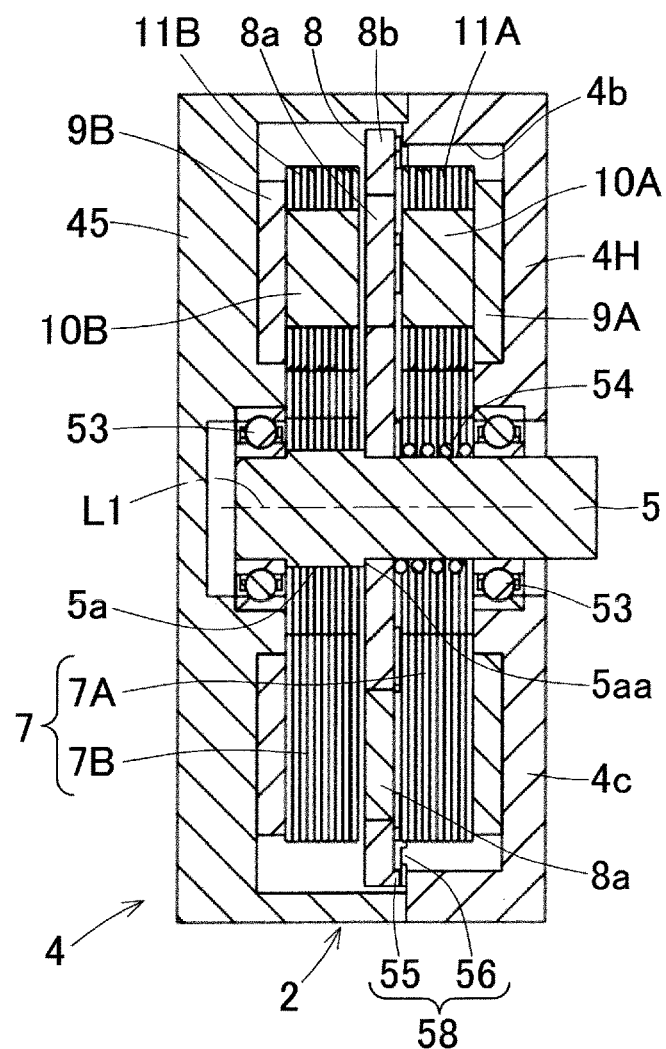
FIG. 2A is a sectional view showing the electric motor etc. in which the engaging portion is not engaged in the electric motor device.

The structure of the electric motor 2 will be described in detail. As shown in FIG. 2A, the stator 7 has first and second excitation mechanisms 7A, 7B which are disposed on opposite axial surfaces of the magnetic field mechanism so as to face each other. The first and second excitation mechanisms 7A, 7B have coils 11A, 11B that form a magnetic circuit corresponding to three-phase alternating current, respectively. As the coils 11A, 11B, for example, a magnet wire winding may be used. The first excitation mechanism 7A has a magnetic body core 10A, a coil 11A wound around the outer circumference of the magnetic body core 10A, and a magnetic body back yoke 9A. The second excitation mechanism 7B has a magnetic body core 10B, a coil 11B wound around the outer circumference of the magnetic body core 10B, and a magnetic body back yoke 9B.

The first excitation mechanism 7A will be described. The magnetic body back yoke 9A is disposed in the motor accommodating part 4b inside the housing main body 4H so as to contact with the separation wall 4c, and the magnetic body core 10A is disposed to axially project from the magnetic body back yoke 9A. A plurality of the magnetic body cores 10A are provided at fixed intervals in the circumferential direction. The coil 11A is wound around each of the magnetic body cores 10A.

The second excitation mechanism 7B will be described. The magnetic body back yoke 9B is disposed inside motor cover 45 so as to contact the bottom of the motor cover 45, and the magnetic body core 10B is disposed to axially project from the magnetic body back yoke 9B. A plurality of the magnetic body cores 10B are also provided at fixed intervals in the circumferential direction. The magnetic body core 10B, the coil 11B and the magnetic body back yoke 9B are otherwise configured in a similar manner as the magnetic body core 10A, the coil 11A and the magnetic body back yoke 9A in the first excitation mechanism 7A described above.

The magnetic body cores 10A, 10B and the magnetic body back yokes 9A, 9B of the respective excitation mechanisms 7A, 7B may preferably be made of, for example, a steel plate laminate that is formed by laminating layers substantially in parallel with the orientation of the magnetic flux because this will provide high torque with small loss, but they may be formed from a single magnetic material. However, it is also possible to use air core coils instead of using the magnetic body cores 10A, 10B, to form the housing 4 from a magnetic material such that the housing acts as a back yoke instead of using the magnetic body back yokes 9A, 9B, or to suitably employ the combination of these technologies to form the excitation mechanisms.

The rotor 8 is a disc-like member having permanent magnets 8a and a holding portion 8b holding the permanent magnets 8a. The holding portion 8b is made from a non-magnetic material, such as resin or stainless steel, for example. The rotor 8 is coupled to an end portion of the rotary input-output shaft 5. In this example, the rotor 8 is axially positioned on and coupled (fitted) to the outer circumferential surface of the end portion of the rotary input-output shaft 5, which portion enters the motor accommodating part 4b and the motor cover 45. Each of the housing main body 4H and motor cover 45 is provided with a rolling bearing 53, 53, and the end portion of the rotary input-output shaft 5 is rotatably supported by the rolling bearings 53, 53. It should be noted that the rotor 8 may also be coupled to, instead of the end portion of the rotary input-output shaft 5, an output shaft that is different from the rotary input-output shaft 5 so as to be coaxial and static with respect to rotary input-output 5.

The outer circumferential surface of the end portion of the rotary input-output shaft 5 is formed with a large-diameter portion 5a that has a larger diameter than that of other portion, and is configured such that the rotor 8 can come into contact with or be separated from a stepped portion 5aa that is an axial end face of the large-diameter portion 5a. In other words, the rotor 8 is configured to be slidable with respect to the housing 4 in the axial direction of the rotational axis L1. The fitting part between the rotor 8 and the end portion of the rotary input-output shaft 5 is provided with any one of, for example, a D-cut, a shape with a width across flats, or splines such that the fitting part can transfer torque from the rotor 8 to the rotary input-output shaft 5. The fitting part is provided with a predetermined gap such that the rotor 8 can slide in the axial direction.

The axially preloading part 54 will be explained. An axially preloading part 54 is provided in the electric motor 2. The axially preloading part 54 applies a preload on the rotor 8 against the housing 4 to retain an axial position of the rotor 8. A compression coil spring is used as the axially preloading part 54 in this example. The compression coil spring is externally provided on the outer circumferential surface of the end portion of the rotary input-output shaft 5, which portion enters the motor accommodating part 4b. Furthermore, the compression coil spring has one axial end that abuts an end face of the inner ring of the rolling bearing 53 on the housing main body 4H side and the other axial end that abuts one side surface of the holding portion 8b of the rotor 8.

Figure 3A:
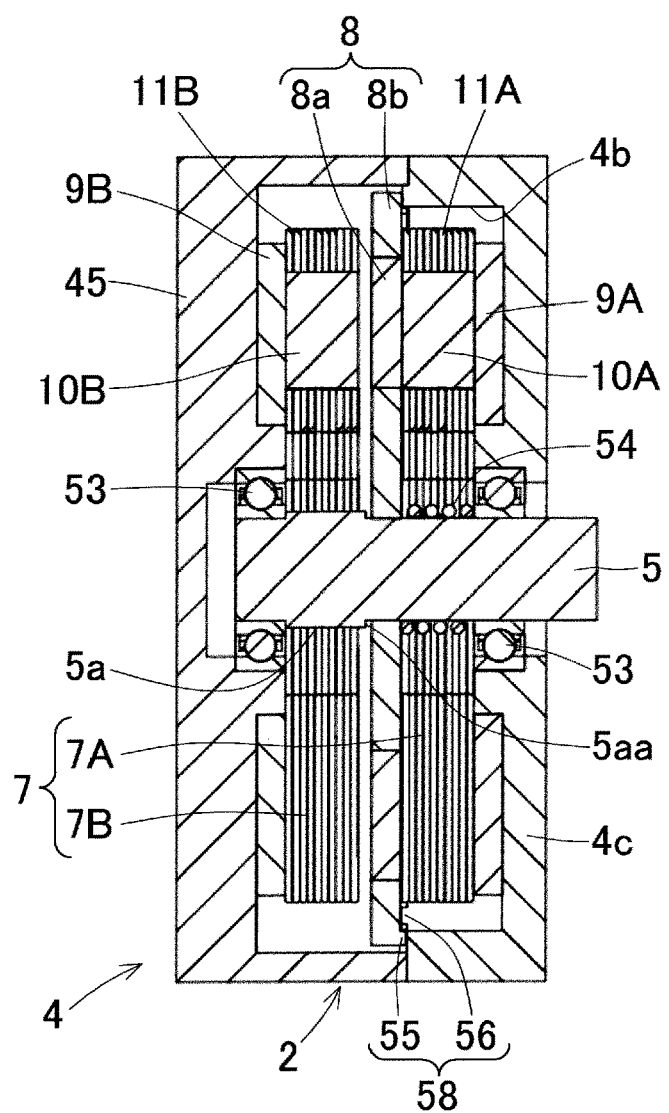
FIG. 3A is a sectional view showing the electric motor etc. in which the engaging portion is engaged in the electric motor device.

Ordinarily, that is, when the rotor 8 performs an ordinary rotation operation, the rotor 8 is constrained to an axial position abutting the stepped portion 5aa of the large-diameter portion 5a due to the preload of the axially preloading part 54. When the rotor 8 is constrained to the axial position, the gaps (clearances) on both axial sides of the rotor 8 fall within respective predetermined ranges. Also, when the rotor 8 is constrained to the axial position, the engaging portion 55 described later is in such a positional relation that the engaging portion 55 does not interfere with the engaged portion 56. When the rotation of the rotor 8 is prevented, the rotor slider 57 (FIG. 5) described later causes the rotor 8 to be slid in the axial direction against the preload of the axially preloading part 54 (FIG. 3A).

Figure 2B:
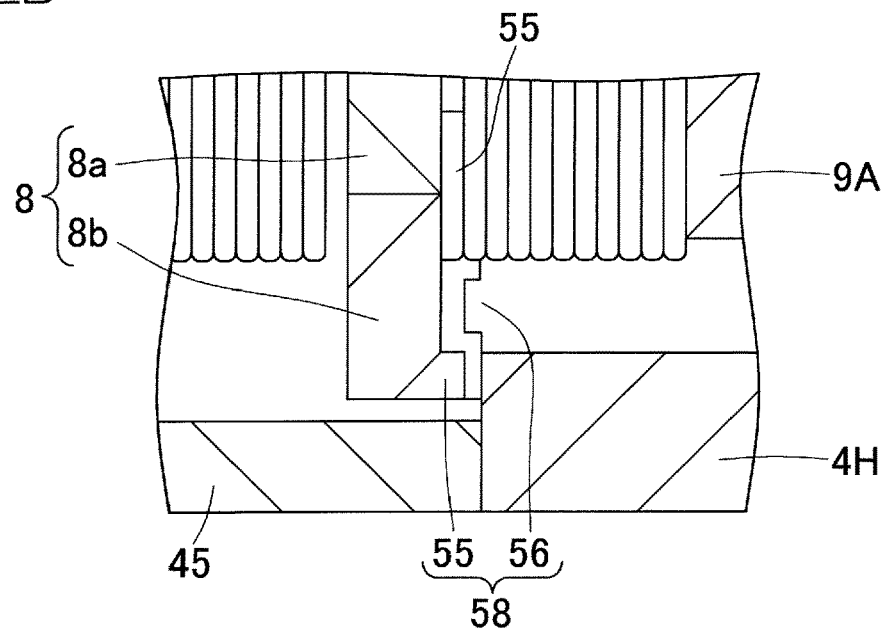
FIG. 2B is an enlarged sectional view showing the engaging portion etc.
Figure 3B:
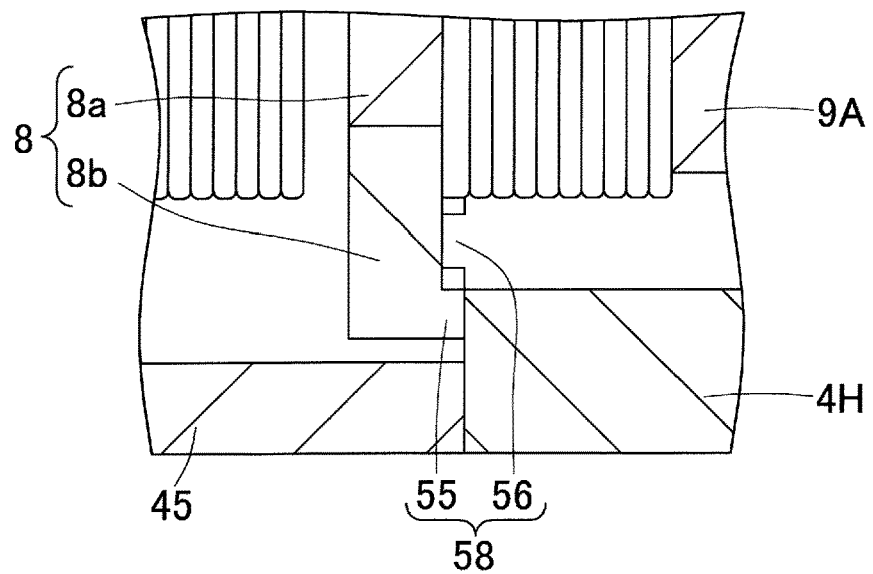
FIG. 3B is an enlarged sectional view showing the engaging portion etc.

The reverse input holder 58 will be described. As shown in FIG. 2A and FIG. 2B, the electric motor 2 is provided with a reverse input holder 58 configured to prevent the rotation of the rotor 8 in at least one direction. The reverse input holder 58 has an engaging portion 55 provided on one axial end face of the rotor 8 and an engaged portion 56 provided on a surface of the housing 4 opposite to the axial end face of the rotor 8. As shown in FIG. 3A and FIG. 3B, the engaged portion 56 is engaged by the engaging portion 55 in a state that the rotor 8 is caused to slide in one axial direction (towards the right side in FIG. 3A). That is, the rotor 8 in FIG. 3A and FIG. 3B shows the state where the rotor 8 in FIG. 2A and FIG. 2B has completed movement towards the right side in the drawings.

Figure 4:
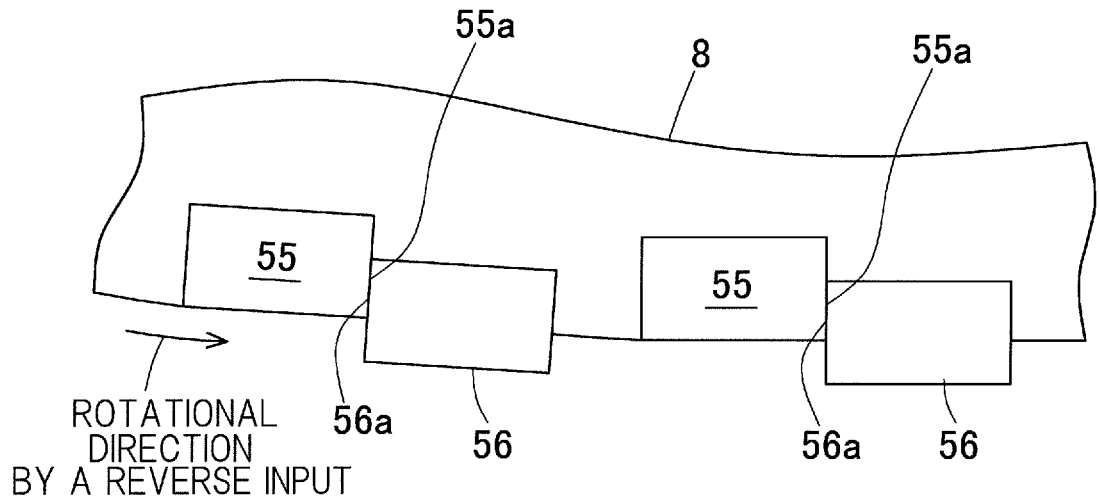
FIG. 4 shows a relation between the engaging portion and the engaged portion.

As shown in FIG. 4, which is a view from the axial direction, a plurality of projections (referred to as "engaging projections") are provided as the engaging portion 55 so as to be equally distributed on the circumference of the outer diameter side portion on one axial end face of the rotor 8. Each of the engaging projections has a cuboid shape or a fan shape projecting by a predetermined distance in the axial direction from the one axial end face of the rotor 8. As shown in FIG. 2B and FIG. 4, a plurality of projections (referred to as "engaged projections") are provided as the engaged portion 56 so as to be equally distributed on the circumference of the open end of the housing main body 4H.

Each of the engaged projections has a cuboid shape or a fan shape projecting by a predetermined distance in the axial direction from the open end of the housing main body 4H. The engaging projections and the engaged projections have contact surfaces 55a, 56a (FIG. 4) that can contact with each other in the circumferential direction, respectively. Each of the contact surfaces 55a, 56a has a vertical surface that is perpendicular to the circumferential direction. Dimensions, pitches for equal distribution and the like of the engaging projections and the engaged projections may be suitably set according to the size and the like of the electric motor 2. It should be noted that the engaging projections and the engaged projections may be unequally disposed in the circumferential direction.

The linear motion mechanism 3 shown in FIG. 1 will be described. The linear motion mechanism 3 applies a braking force on a brake rotor described later in response to an output from the electric motor 2. The linear motion mechanism 3 converts rotary motion of the electric motor 2 to linear motion of the linear motion part 6 via the rotary input-output shaft 5.

The linear motion mechanism 3 has the rotary input-output shaft 5 that is rotationally driven by the electric motor 2, and a conversion mechanism part 31 that converts rotary motion of the rotary input-output shaft 5 to linear motion. The conversion mechanism part 31 has the linear motion part 6; a bearing case 32; a back plate 33 which is an annular thrust plate; a thrust bearing 34 that retains a reaction force against an axial load associated with linear motion of the linear motion part 6; a radial bearing 35; a carrier 36; slide bearings 37, 38; and a planetary roller 39.

The linear motion part 6 having a cylindrical shape is locked so as not to rotate and is supported in an axially movable manner by the inner circumferential surface of the linear motion mechanism accommodating part 4a. Spiral projections formed in a spiral shape projecting radially inward are provided on the inner circumferential surface of the linear motion part 6. A plurality of the planetary rollers 39 mesh with the spiral projections.

The bearing case 32 is provided on one axial end side of the linear motion part 6 in the linear motion mechanism accommodating part 4a. The bearing case 32 has a cylindrical boss portion and a flange portion extending radially outward from the boss portion. A plurality of the radial bearings 35 are fitted to the boss portion, and the rotary input-output shaft 5 is fitted to the inner diameter surfaces of inner rings of the radial bearings 35. The rotary input-output shaft 5 is supported in a rotatable manner by the bearing case 32 via the plurality of radial bearings 35, etc.

The carrier 36 is provided on the inner circumference of the linear motion part 6 so as to be rotatable about the rotary input-output shaft 5. The carrier 36 is supported, in a rotatable manner, by the rotary input-output shaft 5 through the sliding bearings 37, 38 that are fitted between the carrier 36 and the rotary input-output shaft 5. A retaining ring 40 for retaining the axial position of the rotary input-output shaft 5 and the axial position of the carrier 36 relative to the bearing case 32 is provided on the end portion, in the axial direction, of the rotary input-output shaft 5.

The carrier 36 is provided with a plurality of roller shafts 41 spaced apart from each other in the circumferential direction. A plurality of shaft insertion holes are formed in each of opposite axial ends of the carrier 36. Each of the shaft insertion holes is formed as an oblong hole extending in the radial direction over a predetermined distance. The opposite axial ends of each of the roller shafts 41 are inserted in the corresponding shaft insertion holes so that the roller shafts 41 are supported in a movable manner in the radial direction within the range of the corresponding shaft insertion holes. An elastic ring 42 which urges the roller shafts 41 radially inward is extended over each of the opposite axial ends of the plurality of roller shafts 41.

Figure 13:
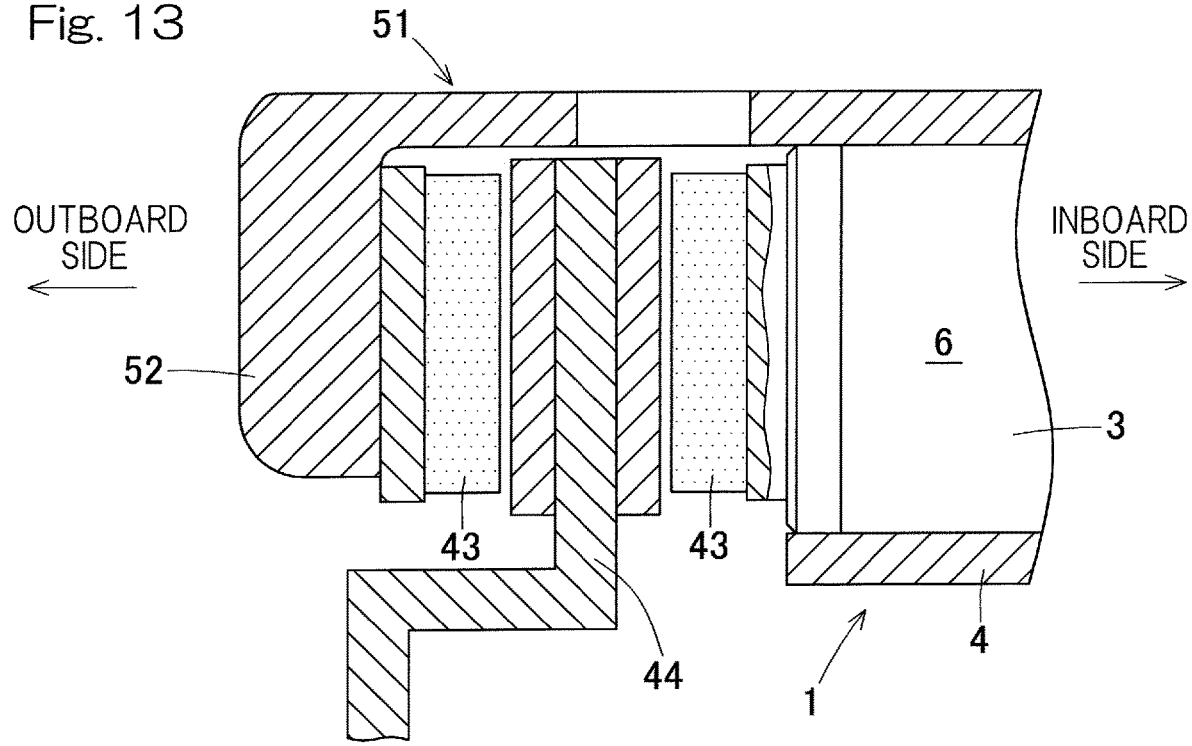
FIG. 13 is a partial sectional view of any electric brake device to be mounted on a vehicle.

The planetary rollers 39 are rotatably supported by the respective roller shafts 41. Circumferential grooves or spiral grooves which mesh with the spiral projections of the linear motion part 6 are formed on the outer circumferential surfaces of the respective planetary rollers 39. The planetary rollers 39 are interposed between the outer circumferential surface of the rotary input-output shaft 5 and the inner circumferential surface of the linear motion part 6. The planetary rollers 39 are pressed against the outer circumferential surface of the rotary input-output shaft 5 by an urging force of the elastic rings 42. Rotation of the rotary input-output shaft 5 by the electric motor 2 causes the planetary rollers 39 in contact with the outer circumferential surface of the rotary input-output shaft 5 to rotate due to contact friction therebetween. In this way, the linear motion part 6 moves in the axial direction so that a friction pad 43 (FIG. 13) provided at the axial end portion of the linear motion part 6 comes into contact with or separates from a brake rotor 44 (FIG. 13).

Figure 5:
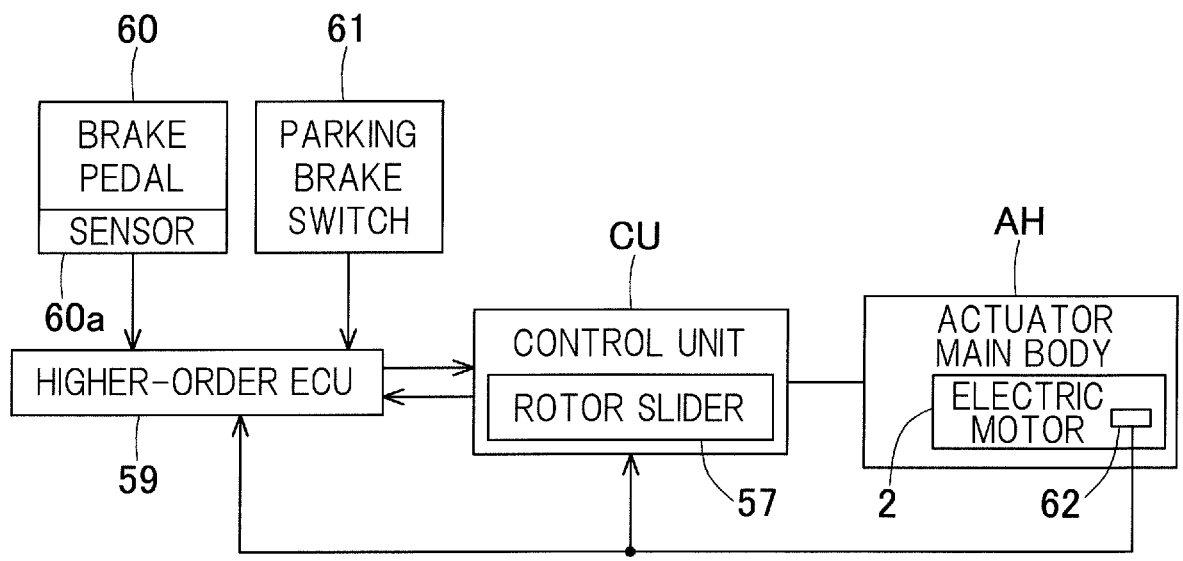
FIG. 5 is a block diagram that schematically shows an example of the system configuration of the electric motor device.

The control unit CU will be described. As shown in FIG. 5, the control unit CU, for example, is an inverter device that is used in an electric brake device as in the FIG. 13, which will be described later, to control rotation of the electric motor 2 of the actuator main body AH. The control unit CU is connected with a higher-order electric control unit (ECU) 59 that is a superordinate control unit. For example, an electric control unit that controls an entirety of vehicle is employed as the higher-order ECU 59. The higher-order ECU 59 generates and outputs a target braking force, i.e. a braking force command value, of each wheel according to an output of a sensor 60a that varies in response to an operation amount of a brake pedal 60. The control unit CU controls the electric motor 2 and drives the actuator main body AH according to the braking force command value.

The higher-order ECU 59 is connected with, for example, a parking brake switch 61. When an operator operates the parking brake switch 61 while a vehicle is stopped/parked or at stoppage, an operation command signal is inputted into the higher-order ECU 59. The higher-order ECU 59 determines whether the vehicle is parked (or at stoppage) or not, for example, from a sensor output from the sensor 60a and a sensor output from an angle sensor 62 of the electric motor 2. As shown in FIG. 5, the rotor slider 57 of the control unit CU causes the rotor 8 to be slid in the axial direction against the preload of the axially preloading part 54 according to the operation command signal provided from the higher-order ECU 59. In this example, the rotor slider 57 slides the rotor 8 in the axial direction by an axial electromagnetic force that acts on the stator 7 and the rotor 8.

The rotor slider 57 generates the axial electromagnetic force by a current component corresponding to an excitation magnetic flux in a direction corresponding to the orientation of magnetic poles of the magnetic field mechanism. The current component corresponds to a d-axis current in current vector control in a permanent magnet synchronous motor. For example, when a d-axis current that weakens the excitation magnetic flux is applied to one of the stator 7a and the stator 7b, an axial repulsive force is generated between the rotor 8 and said one of the stator 7a and the stator 7b. In contrast, when a d-axis current that enhances the excitation magnetic flux is applied to one of the stator 7a and the stator 7b, an axial attractive force is generated between the rotor 8 and said one of the stator 7a and the stator 7b. Specifically, when a d-axis current that enhances the excitation magnetic flux is applied to the stator 7a and a d-axis current that weakens the excitation magnetic flux is applied to the stator 7b, the rotor 8 slides towards the friction pad 43. That is, the rotor slider 57 adjusts the d-axis current such that an electromagnetic force is generated to slide the rotor 8 in the axial direction against the preload of the axially preloading part 54.

The rotor slider 57 causes the rotor 8 to be slid in the axial direction, bringing the engaging portion 55 into engagement with the engaged portion 56, as shown in FIG. 3A and FIG. 3B. During the engagement, the reverse input holder 58 maintains the engagement between the engaging portion 55 and the engaged portion 56 against a reverse input load that acts on the rotor 8 as an external force accompanying a reaction force of a pressing force of the friction pad 43 (FIG. 13), and thereby retains a rotation angle of the rotor 8. As shown in FIG. 4, while a reverse input load acts on the rotor 8, the friction force generated on the contact surfaces 55a, 56a of the engaging portion 55 and the engaged portion 56 keeps the rotor 8 slid in one axial direction, and thereby maintains the engagement. Even when power applied to the electric motor 2 (FIG. 1) is shut off or lowered, the engagement is maintained so as to retain the rotation angle of the rotor 8.

Figure 6:
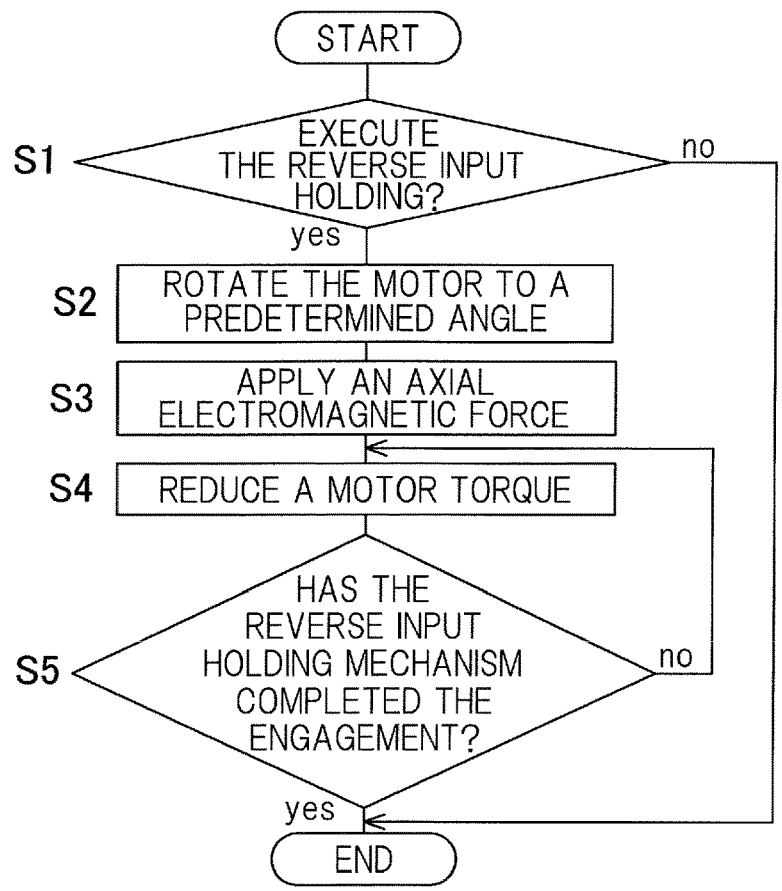
FIG. 6 is a flow chart that shows an example of operating reverse input holding of the rotor in the electric motor device.

FIG. 6 is a flow chart that shows an example of executing reverse input holding of the rotor in the electric motor device. The following explanation is made with reference to FIG. 5 as well. The process is started when a condition that the vehicle is at stoppage is met. The higher-order ECU 59 determines whether or not to execute the reverse input holding of the rotor 8 (FIG. 1) (step S1). In this step, as this determination, the higher-order ECU 59, for example, determines presence or absence of operation of the parking brake switch 61. When it is determined that the parking brake switch 61 is not operated (step S1: no), the process is ended.

When it is determined that the parking brake switch 61 is operated (step S1: yes), the control unit CU cause the electric motor 2 to rotate to a predetermined motor angle (step S2). The predetermined motor angle is, for example, calculated by the control unit CU according to a value resultant by adding to the rotational angle of the rotor 8 (FIG. 2A, FIG. 2B), which is desired to be retained by the reverse input holder 58 (FIG. 2A, FIG. 2B), with a predetermined angle for eliminating influence by pitches and clearances of the engaging portion 55 (FIG. 2A, FIG. 2B) and the engaged portion 56 (FIG. 2A, FIG. 2B).

Next, the rotor slider 57 causes the rotor 8 (FIG. 3A, FIG. 3B) to slide in the axial direction by an axial electromagnetic force (step S3). Then, the control unit CU reduces the motor torque (step S4). Thereafter, the control unit CU determines whether the reverse input holder 58 (FIG. 2A, FIG. 2B) has completed the engagement, i.e. whether the engagement between the engaging portion 55 and the engaged portion 56 is being maintained (step S5). Completion of the engagement of the reverse input holder 58 (FIG. 2A, FIG. 2B) in the step S5 can be determined, for example, from a state where the rotor 8 (FIG. 2A, FIG. 2B) does not rotate even when the motor torque and the axial electromagnetic force are shut off. The state where the rotor 8 (FIG. 2A, FIG. 2B) does not rotate can be determined from a sensor output of the angle sensor 62. When it is determined that the engagement of the reverse input holder 58 (FIG. 2A, FIG. 2B) has not been completed (step S5: no), the process goes back to the step S4. When it is determined that the engagement of the reverse input holder 58 (FIG. 2A, FIG. 2B) has been completed (step S5: yes), the process is ended.

The rotor slider 57 is specifically configured with a software function on a processor (not illustrated) or a hardware circuit which can perform calculation to output a result by using an LUT (Look Up Table) achieved by a software or a hardware, or by using a predetermined conversion function stored in a library of a software or a hardware equivalent to such a function, as well as by using a comparison function or arithmetical operation functions in the library or a hardware equivalent to such functions as needed.

Operations and advantageous effects of the embodiment will be described. According to the electric motor device described above, when the rotor 8 performs an ordinary rotation operation, the axial position of the rotor 8 is retained such that the rotor 8 is rotatable with respect to the stator 7. When the parking brake switch 61 is operated while the vehicle is at stoppage, the rotor slider 57 slides the rotor 8 in one axial direction against the preload of the axially preloading part 54. This brings the engaging portion 55 of the rotor 8 into engagement with the engaged portion 56 of the housing 4. The reverse input holder 58 retains the rotation angle of the rotor 8 during the engagement by the engagement between the engaging portion 55 and the engaged portion 56 to be maintained against a reverse input load acting on the rotor 8 as an external force accompanying a reaction force of a pressing force of the brake friction member.

In such a way, use of a structure that slides the rotor 8 in one axial direction to bring the engaging portion 55 of the rotor 8 and the engaged portion 56 of the housing 4 into engagement eliminates the necessity of externally providing a lock mechanism, such as a solenoid, as a separate component. Thus, it is possible to save space and to reduce the number of components. Reduction of unnecessary components such as a reduction gear or the like makes it possible to save space, to reduce the number of components as well as to reduce costs. When a reverse input load acts on the rotor 8, the friction force generated on the contact surfaces 55a, 56a of the engaging portion 55 and the engaged portion 56 keeps the state that the rotor 8 is slid in one axial direction and thereby maintains the engagement. Even when power applied to the electric motor 2 is shut off or lowered, the engagement is maintained so as to retain the rotation angle of the rotor 8. Thus, it is possible to suppress power consumption of a vehicle or a device on which the electric brake device is mounted.

This electric motor device has a so-called axial gap motor in which the rotor 8 and the stator 7 are arranged such that the orientations of the magnetic poles are in parallel with the rotational axis L1. Such an axial gap motor can generate a strong electromagnetic force in comparison with, for example, a radial gap motor having magnetic poles in a radial direction of a rotational axis.

According to this configuration, the rotor slider 57 can slide the rotor 8 in the axial direction owing to the electromagnetic force in the axial direction of the axial gap motor having the existing stator 7 and rotor 8. That is, the rotor slider 57 adjusts the d-axis current in the stator 7 such that an electromagnetic force is generated to slide the rotor 8 in the axial direction. As the rotor 8 can be slid in the axial direction by using the existing stator 7 and rotor 8 in such a manner, it is possible to save space, to reduce the number of components and to reduce costs in comparison with, for example, a configuration externally added with a lock mechanism, such as a solenoid and an electromagnet.

Other embodiments will be described. In the following description, features in each embodiment corresponding to the features previously described are denoted by the same reference numerals, and the repeated description thereof is omitted. When only a part of a feature is described, the remaining part of the feature is the same as that of the previously described embodiment unless otherwise specified. The same advantageous effect is achieved by the same feature. In addition to the combinations of components described specifically in the respective embodiments, it is also possible to partially combine the embodiments unless any problem is not particularly caused by such combinations.

Figure 7:
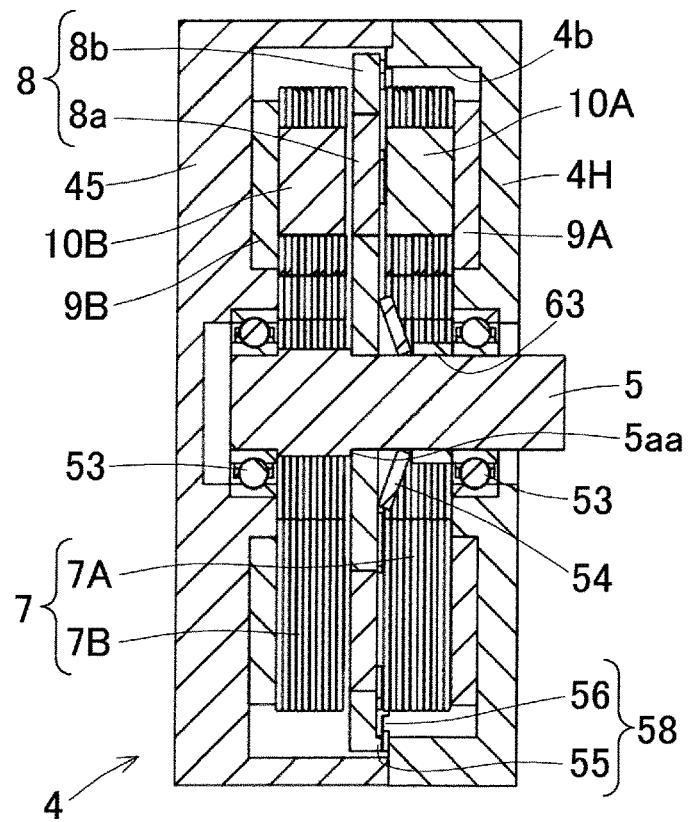
FIG. 7 is a sectional view of major parts of an electric motor device according to another embodiment of the present invention.

As shown in FIG. 7, a disc spring may be applied as the axially preloading part 54. In this example, the disc spring is externally mounted via a collar 63 to the outer circumferential surface of the end portion of the rotary input-output shaft 5, which portion enters the motor accommodating part 4b. Furthermore, the disc spring has one axial end that abuts the end face of the inner ring of the rolling bearing 53 on the housing main body 4H side via a collar 63 and the other axial end that abuts one side surface of the holding portion 8b of the rotor 8. The axially preloading part 54 in the form of the disc spring can also apply a preload on the rotor 8 against the housing 4 to retain the axial position of the rotor 8.

Figure 8A:
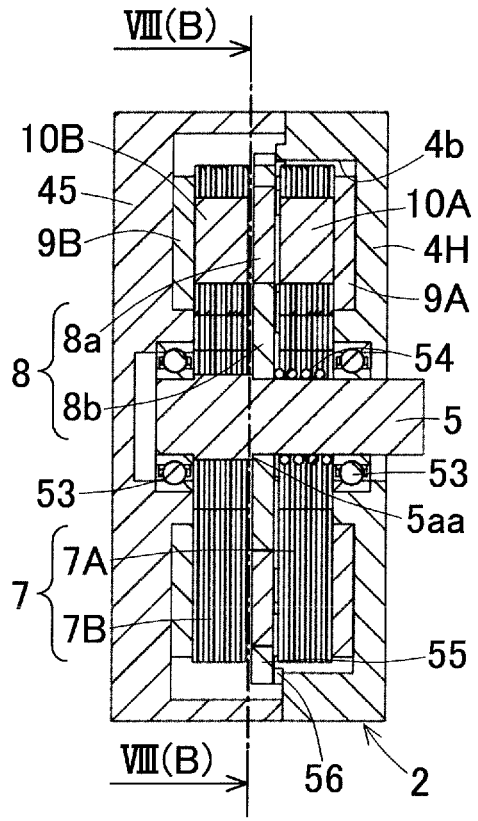
FIG. 8A is a sectional view of an electric motor device according to still another embodiment of the present invention.
Figure 8B:
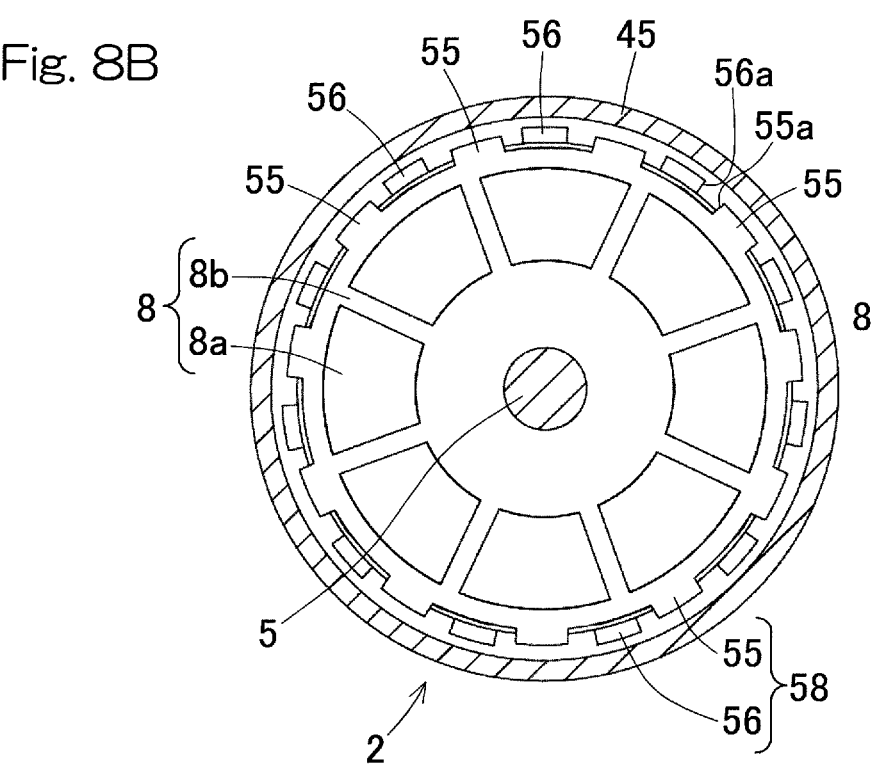
FIG. 8B is a sectional view along line VIII(B)-VIII(B) of FIG. 8A.

As shown in FIG. 8A and FIG. 8B, engaging projections may be provided as the engaging portion 55 on the outer circumferential surface of the rotor 8, and engaged projections may be provided as the engaged portion 56 on the inner circumferential surface of the housing main body 4H. These engaging projections and the engaged projections have contact surfaces 55a, 56a that can contact with each other in the circumferential direction, respectively. Dimensions, pitches for equal distribution and the like of the engaging projections and the engaged projections may be suitably set according to the size and the like of the electric motor 2. When the rotor 8 performs an ordinary rotation operation, the preload of the axially preloading part 54 axially separates the engaging projections from the engaged projections such that the engaging projections and the engaged projections are under non-engagement state where they do not interfere to come into engagement. When the reverse input holding function of the reverse input holder 58 is used, the rotor slider 57 (FIG. 5) slides the rotor 8 towards the right side of FIG. 8A against the preload of the axially preloading part 54, bringing the engaging projections 55 into engagement with the engaged projections 56. Thus, the rotation of the rotor 8 is prevented.

Figure 9A:
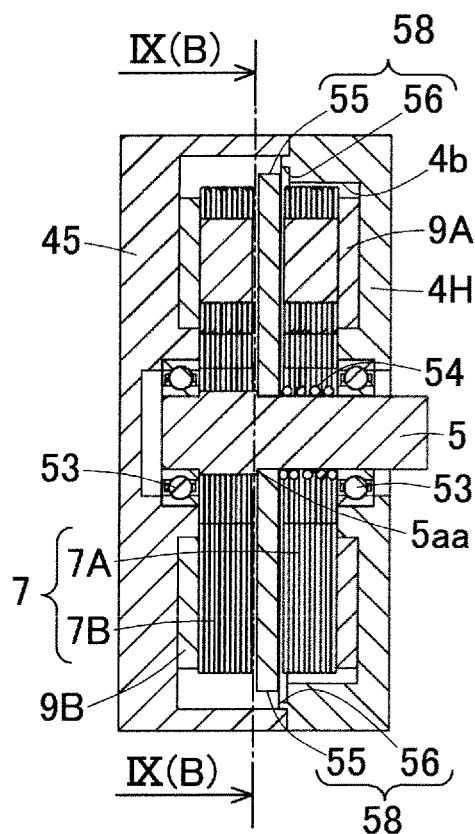
FIG. 9A is a sectional view of an electric motor device according to still another embodiment of the present invention.
Figure 9B:
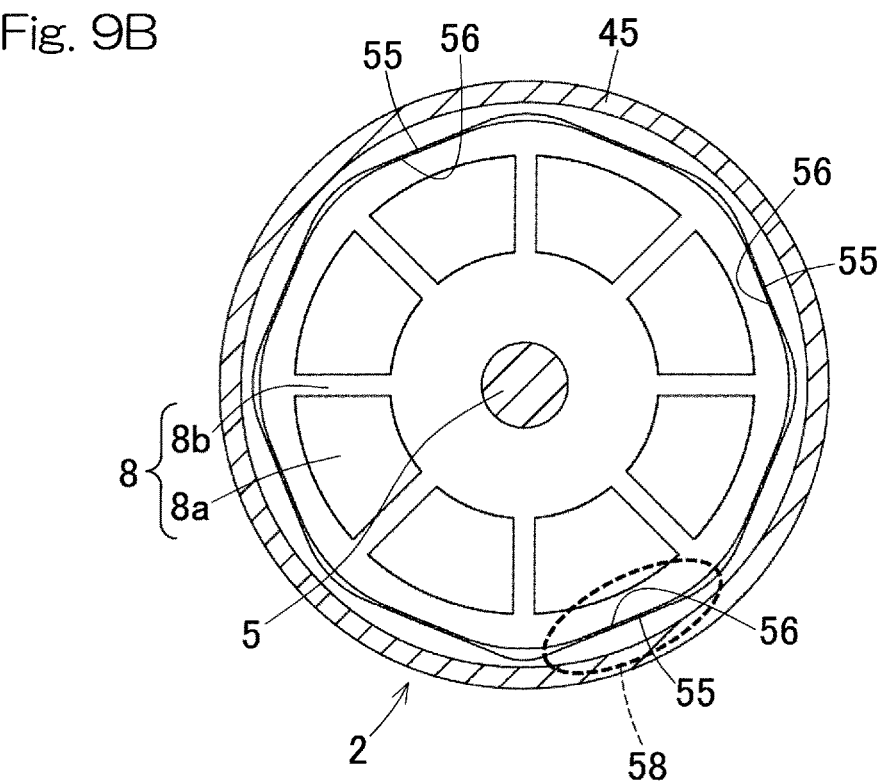
FIG. 9B is a sectional view along line IX(B)-IX(B) of FIG. 9A.

As shown in FIG. 9A and FIG. 9B, the engaging portion 55 of a polygonal (in this example, octagonal) shape may be provided on the outer circumferential surface of the rotor 8, and the engaged portion 56 of a polygonal (in this example, octagonal) shape may be provided on the inner circumferential surface of the housing main body 4H. The rotor slider 57 (FIG. 5) slides the rotor 8 towards the right side of FIG. 9A against the preload of the axially preloading part 54, bringing the flat surface of the engaging portion 55 into contact with the flat surface of the engaged portion 56. Thus, the engaging projections engage with the engaged projections. Therefore, the rotation of the rotor 8 is prevented.

Figure 10:
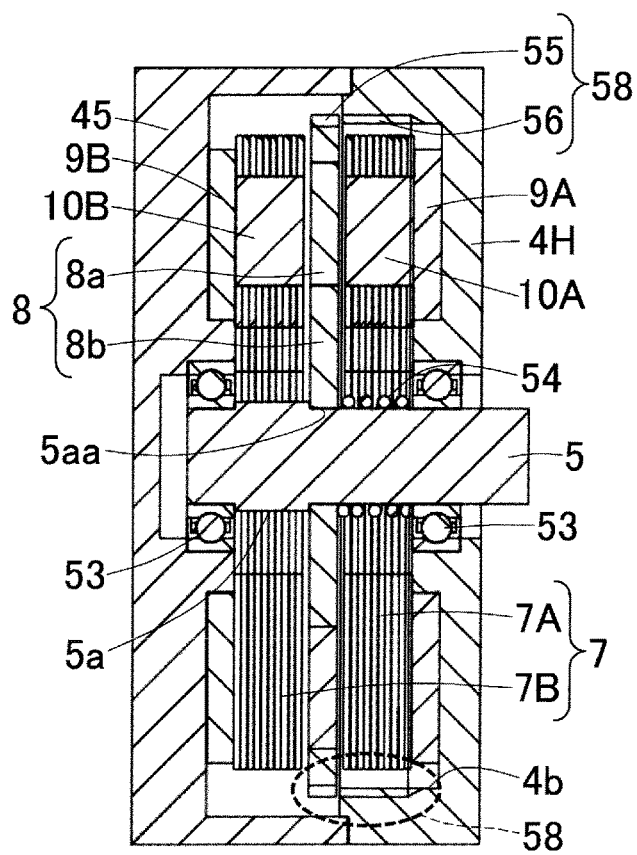
FIG. 10 is a sectional view of an electric motor device according to still another embodiment of the present invention.

As shown in FIG. 10, the engaging portion 55 may be provided in a form of male threads on the outer circumferential surface of the rotor 8, and the engaged portion 56 may be provided in a form of female threads on the inner circumferential surface of the housing main body 4H. It is preferable to provide the male threads and the female threads, for example, in such a direction that the male threads are screwed into the female threads when a reverse input load is applied to the rotor 8 because this makes it possible to maintain the engagement regardless of magnitude of the reverse input load.

Figure 11:
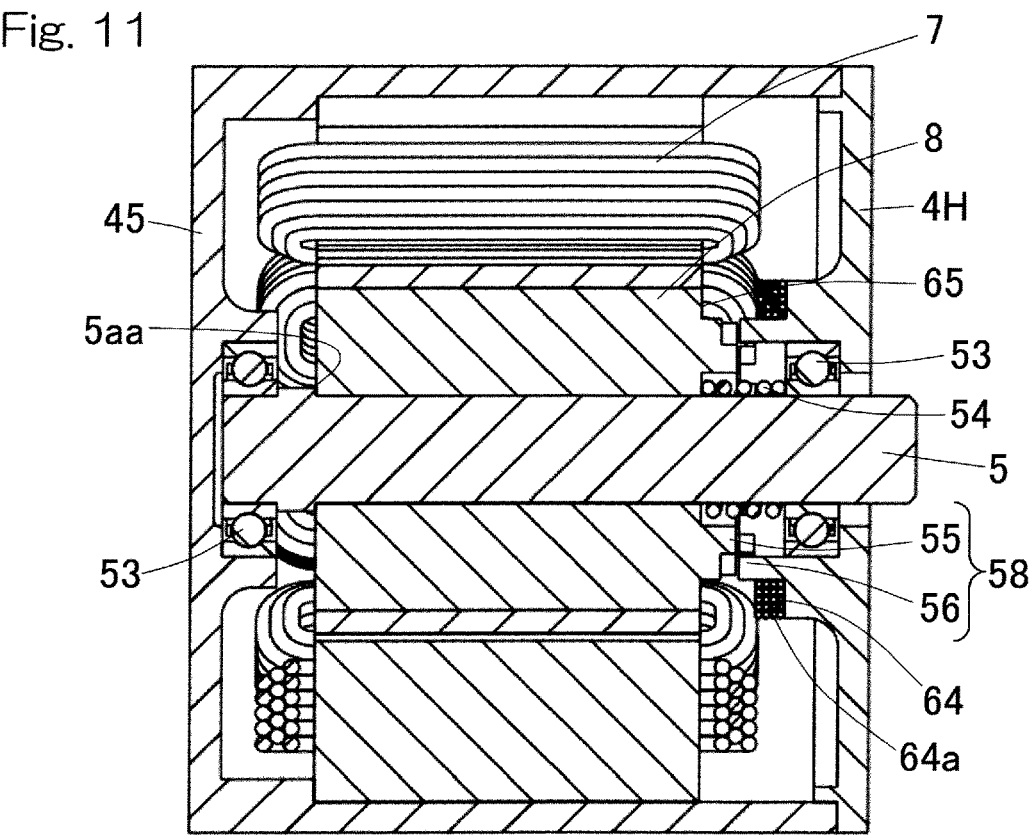
FIG. 11 is a sectional view of an electric motor device according to still another embodiment of the present invention.

As shown in FIG. 11, an electric motor device may be applied with a radial gap motor such that a plurality of engaging projections are provided as the engaging portion 55 so as to be equally distributed on the circumference of one axial end face of the rotor 8, and a plurality of engaged projections are provided as the engaged portion 56 so as to be equally distributed on the circumference of the open end of the housing main body 4H. In this example of the radial gap motor, electromagnets 64 are provided in the housing main body 4H such that the electromagnets axially opposes to one axial end face of the rotor 8. The rotor 8 has a magnetic body 65 on said one axial end face, and the rotor slider 57 (FIG. 5) is the electromagnets 64 including coils 64*a* provided so as to oppose to the magnetic body 65.

In a radial gap motor, no axial electromagnetic force is basically generated by the stator, unlike the axial gap motor described above. Therefore, in the embodiment in FIG. 11, an attractive force from the electromagnets 64 provided so as to axially oppose to the rotor 8 slides the rotor 8 in the axial direction against the preload of the axially preloading part 54, bringing the engaging portion 55 into engagement with the engaged portion 56. It should be noted that, besides this example, it is also possible to, for example, provide permanent magnets on the surface of the rotor opposite to the electromagnets such that the electromagnets can apply forces in two directions, namely, an attractive force and a repulsive force. In that case, it is possible to omit an axially preloading part. In this way, it is possible to reduce the number of components and to reduce costs.

In the electric motor device in FIG. 1 to FIG. 10, it is shown as an example that an electromagnetic force of the excitation mechanism of the stator 7 is used as the rotor slider to slide the rotor 8, but this example should not be taken as limiting the scope of the present invention. In the electric motor device in FIG. 1 to FIG. 10, it is also possible to separately provide, as a rotor slider, for example, the electromagnets 64 shown in FIG. 11 in the housing main body 4H.

Figure 12A:
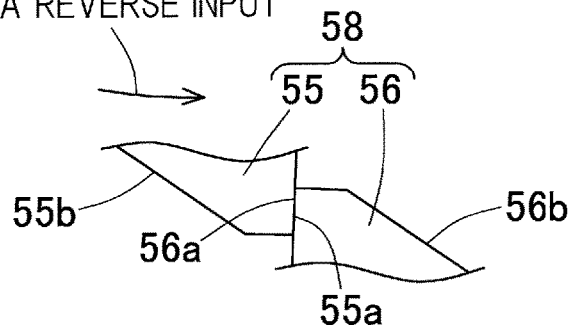
FIG. 12A is an enlarged axial view of a portion of an engaging portion etc. of an electric motor device according to still another embodiment of the present invention.

As shown in FIG. 12A, the engaging projections and the engaged projections may be configured such that only the contact surfaces 55*a*, 56*a* that contact with each other with respect to a rotational direction due to a reverse input have vertical surfaces that are perpendicular to the circumferential direction, whereas the opposite sides in the circumferential direction are formed as gradually inclined surfaces 55*b*, 56*b*, respectively. According to this configuration, for example, in cases where a reverse input that holds rotation of a rotor is applied only one direction in an application in an electric parking brake device or the like, the rotor can move in an axial direction along the inclined surfaces, even if the rotor rotates in the opposite direction to that of the reverse input. This opposite rotation sometimes occurs when the rotor is unintentionally slid in the axial direction by the rotor slider while the vehicle is at stoppage. Therefore, the engaging projections and the engaged projections are not secured to each other, and it is possible to slide the rotor to easily return to the initial axial position.

Figure 12B:
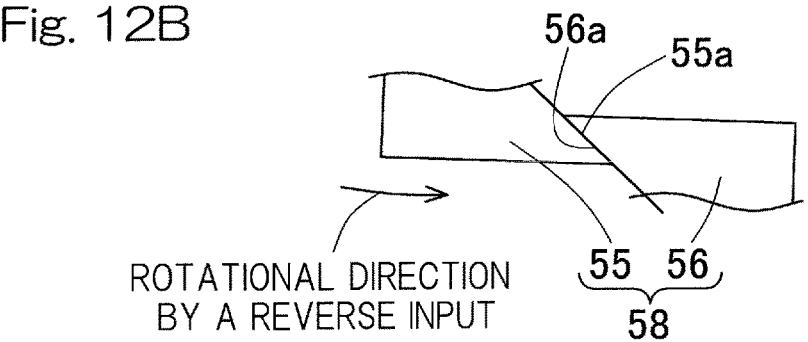
FIG. 12B is an enlarged axial view of a portion of an engaging portion etc. of an electric motor device according to still another embodiment of the present invention.

As shown in FIG. 12B, the engaging projections and the engaged projections may be provided with contact surfaces 55*a*, 56*a*, respectively, in the form of inclined surfaces that contact with each other in a wedge shape with respect to the rotational direction due to a reverse input. According to this configuration, it is possible to retain the engagement without depending on a friction force between the contact surfaces 55*a*, 56*a* of the engaging projections and the engaged projections. In the case of these shapes, the engagement is retained even if a reverse input force is small in comparison with the engaging projections and the engaged projections (FIG. 4) which are in a cuboid shape.

FIG. 13 is a partial sectional view of an electric brake device to be mounted on a vehicle. The electric brake device essentially has an actuator main body as described above, a brake rotor 44 that is a rotary member integrally rotating with a wheel, and a friction pad (friction member) 43 configured to contact with the brake rotor 44 to generate a braking force, and further includes a control unit CU (FIG. 1) configured to control an electric motor. The vehicle is provided with a caliper 51 so as to surround the outer circumferential side portion of each brake rotor 44. The caliper 51 is provided integrally with the housing 4 of the electric motor.

A claw portion 52 is provided on an outboard side end of the caliper 51. The claw portion 52 faces an outboard side lateral surface of the brake rotor 44 in the axial direction. The friction pad 43 on the outboard side is supported by the claw portion 52. The friction pad 43 on the inboard side is supported by the outboard side end of the linear motion part 6 of the linear motion mechanism 3 in the caliper 51. The friction pad 43 faces an inboard-side lateral surface of the brake rotor 44 in the axial direction. The actuator main body performs driving so as to cause the friction pads 43 to come into contact with or be separate from the brake rotor 44.

A mount (not illustrated) is supported by a not-illustrated knuckle of the vehicle. A pair of pin support pieces (not illustrated) are provided on opposite ends of the mount in the longitudinal direction. A not-illustrated slide pin extending in parallel with the axial direction is provided at each end of the pin support pieces. The caliper 51 is supported by the slide pins so as to be slidable in the axial direction.

The control unit controls rotation of the electric motor according to the operation amount of a not-illustrated brake pedal. During braking, driving of the electric motor causes the friction pad 43 on the inboard side to contact with the brake rotor 44 and press the brake rotor 44 in the axial direction. A reaction force of the pressing force causes the caliper 51 to slide toward the inboard side. Accordingly, the friction pad 43 on the outboard side that is supported by the claw portion 52 of the caliper 51 comes into contact with the brake rotor 44. The friction pads 43, 43 on the outboard side and the inboard side firmly hold the brake rotor 44 from both sides in the axial direction to apply a braking force on the brake rotor 44.

The positions of the engaging portion and the engaged portion are not limited to the examples previously described. For example, instead of installing the engaging portion and the engaged portion as in the example of FIG. 8A, FIG. 8B, it is also possible to coaxially provide the rotor with a rotor side cylindrical part of a cylindrical shape on one axial end of the rotor in FIG. 8A, FIG. 8B as well as to provide the housing main body with a housing side cylindrical part of a cylindrical shape that radially faces the inner circumferential surface of the rotor side cylindrical part. A plurality of engaging projections are provided so as to be equally distributed on the circumference on the inner circumferential surface of the rotor side cylindrical part, and a plurality of engaged projections are provided so as to be equally distributed on the circumference on the outer circumferential surface of the housing side cylindrical part. The engaging projections are brought into engagement with the engaged projections in a state that the rotor is caused to slide in one axial direction. It should be noted that the radial size relation between the rotor side cylindrical part and the housing side cylindrical part may be inverted.

It would be preferable that the rotor holds permanent magnets by a holding portion made of a non-magnetic material because of small loss, but it is also possible to use a holding portion made of a magnetic material to hold permanent magnets. The rotor may also be configured such that a single magnet magnetized at a plurality of magnetic poles in the axial direction is directly fixed to the rotary input-output shaft, without using a holding portion.

As a structure of the electric motor, it is preferable to constitute a permanent magnet synchronous motor having permanent magnets as described above because this provides high torque while saving space. But it is also possible, for example, to use a reluctance motor which employs a salient pole-type iron core whose stator inductance changes due to rotation of the rotor, without using any permanent magnet in the rotor. It should be understood that the numbers of poles of the magnetic field mechanism and the excitation mechanism are suitably selected according to design requirements and that sensors, such as an angle sensor and a thermistor, and wiring structure or the like are appropriately provided according to design requirements.

In the embodiment in which an axial gap motor is applied, a motor of a double stator type having stators on opposite sides of the rotor in the axial direction is used, but this may be, for example, of a single type having a pair of a stator and a rotor disposed so as to face each other in the axial direction. It is also possible, without providing an axially preloading part, for example, to perform control such that the engaging portion does not interfere with the engaged portion when the rotor performs an ordinary rotation operation by using the stator to apply an electromagnetic force such that the rotor comes into abutment with the stepped portion of the rotary input-output shaft.

Although the present invention has been fully described in connection with the preferred embodiments thereof with reference to the accompanying drawings, various additions, modification, and deletions can be made without departing from the scope of the present invention. Accordingly, such additions, modification, and deletions are to be construed as also included in the scope of the present invention.

REFERENCE NUMERALS

1 . . . electric motor device
4 . . . housing
7 . . . stator
8 . . . rotor
8*a* . . . permanent magnet
54 . . . axially preloading part
55 . . . engaging portion
56 . . . engaged portion
57 . . . rotor slider
58 . . . reverse input holder

What is claimed is:

1. An electric motor device comprising:
a housing;
a stator fixed to the housing; and
a rotor supported by the housing and configured to rotate with respect to the stator, wherein
the rotor is configured to be slidable in an axial direction of a rotation axis,
the electric motor device further comprises a rotor slider configured to slide the rotor in the axial direction and a reverse input holder configured to prevent rotation of the rotor in at least one direction,
the reverse input holder includes an engaging portion provided on the rotor and an engaged portion provided on the housing and configured to be engaged by the engaging portion in a state that the rotor is caused to slide in one axial direction by the rotor slider,
when the engaging portion and the engaged portion are in engagement, the engagement between the engaging portion and the engaged portion is maintained against a reverse input load that acts on the rotor as an external force, and thereby retains a rotation angle of the rotor,
the rotor and the stator are arranged such that orientations of magnetic poles are in parallel with the rotational axis,
the rotor slider is configured to slide the rotor in the axial direction by an electromagnetic force in the axial direction that acts on the stator and the rotor,
the rotor is a magnetic field mechanism having a permanent magnet,
the stator is an excitation mechanism having coils that form a magnetic circuit corresponding to three-phase alternating current, and
the rotor slider is configured to generate the electromagnetic force by a current component corresponding to an excitation magnetic flux in a direction corresponding to an orientation of magnetic poles of the magnetic field mechanism.

2. The electric motor device as claimed in claim 1, further comprising an axially preloading part to apply preload on the rotor against the housing so as to hold the axial position of the rotor, wherein the rotor slider is configured to slide the rotor in the axial direction against the preload of the axially preloading part.

3. The electric motor device as claimed in claim 1, wherein the rotor has a magnetic body on an axial end face thereof, and the rotor slider is an electromagnet arranged so as to face the magnetic body.

4. The electric motor device as claimed in claim 1, wherein the engaging portion is provided on an axial end face of the rotor, the engaged portion is provided on a surface of the housing opposite to the axial end face of the rotor, and the engaging portion and the engaged portion have contact surfaces that can contact with each other in a circumferential direction.

5. The electric motor device as claimed in claim 1, wherein the engaging portion is provided on an outer circumferential surface of the rotor, the engaged portion is provided on an inner circumferential surface of the housing opposite to the outer circumferential surface of the rotor, and the engaging portion and the engaged portion have contact surfaces that can contact with each other in a circumferential direction.

* * * * *